May 30, 1950 — O. C. GRUENDER — 2,509,920
FEEDING DEVICE FOR GYRATORY CRUSHERS
Filed Aug. 4, 1947 — 7 Sheets-Sheet 1

Inventor
Oscar C. Gruender
by Parker & Carter
Attorneys

Inventor
Oscar C. Gruender
by Parker & Carter
Attorneys.

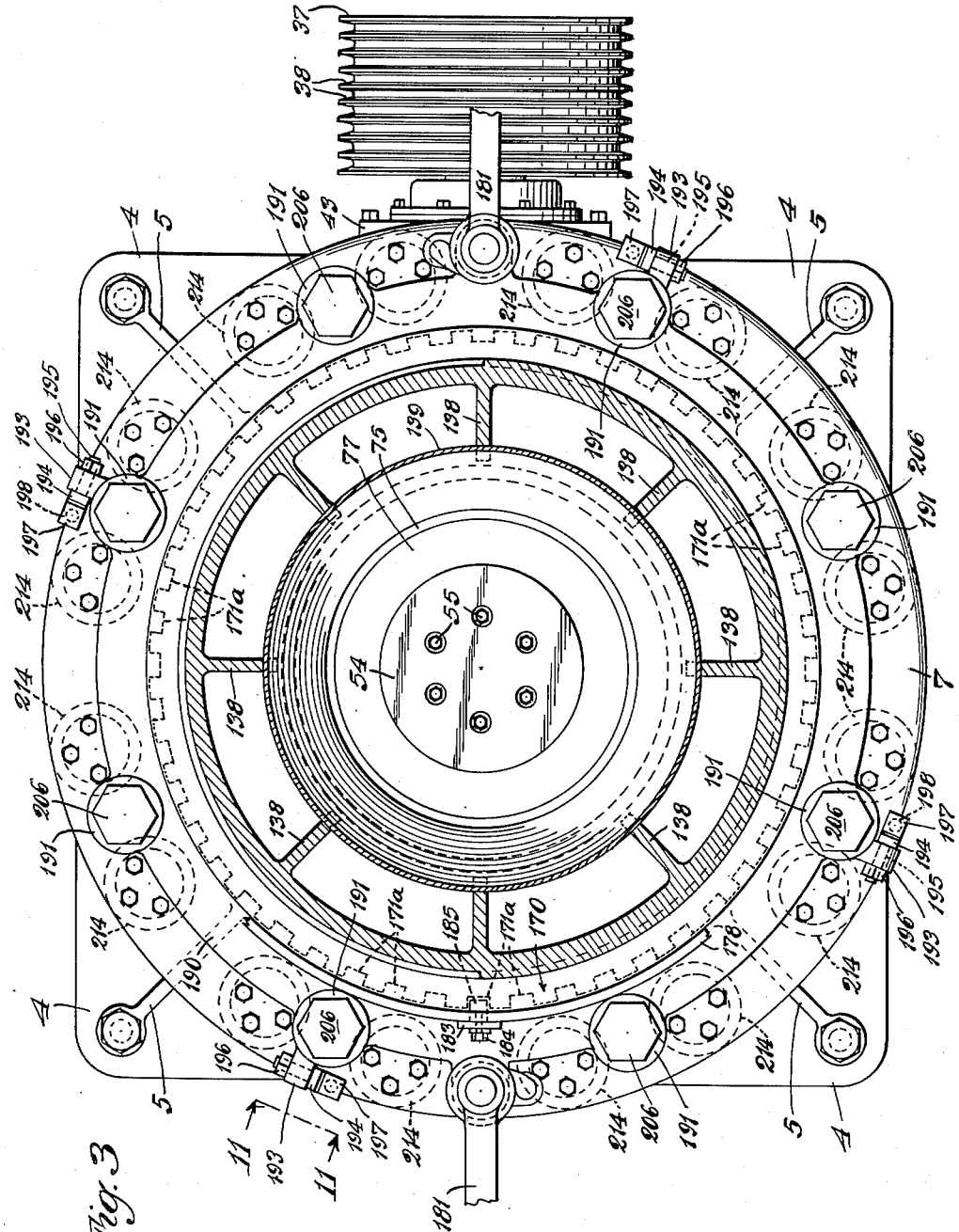

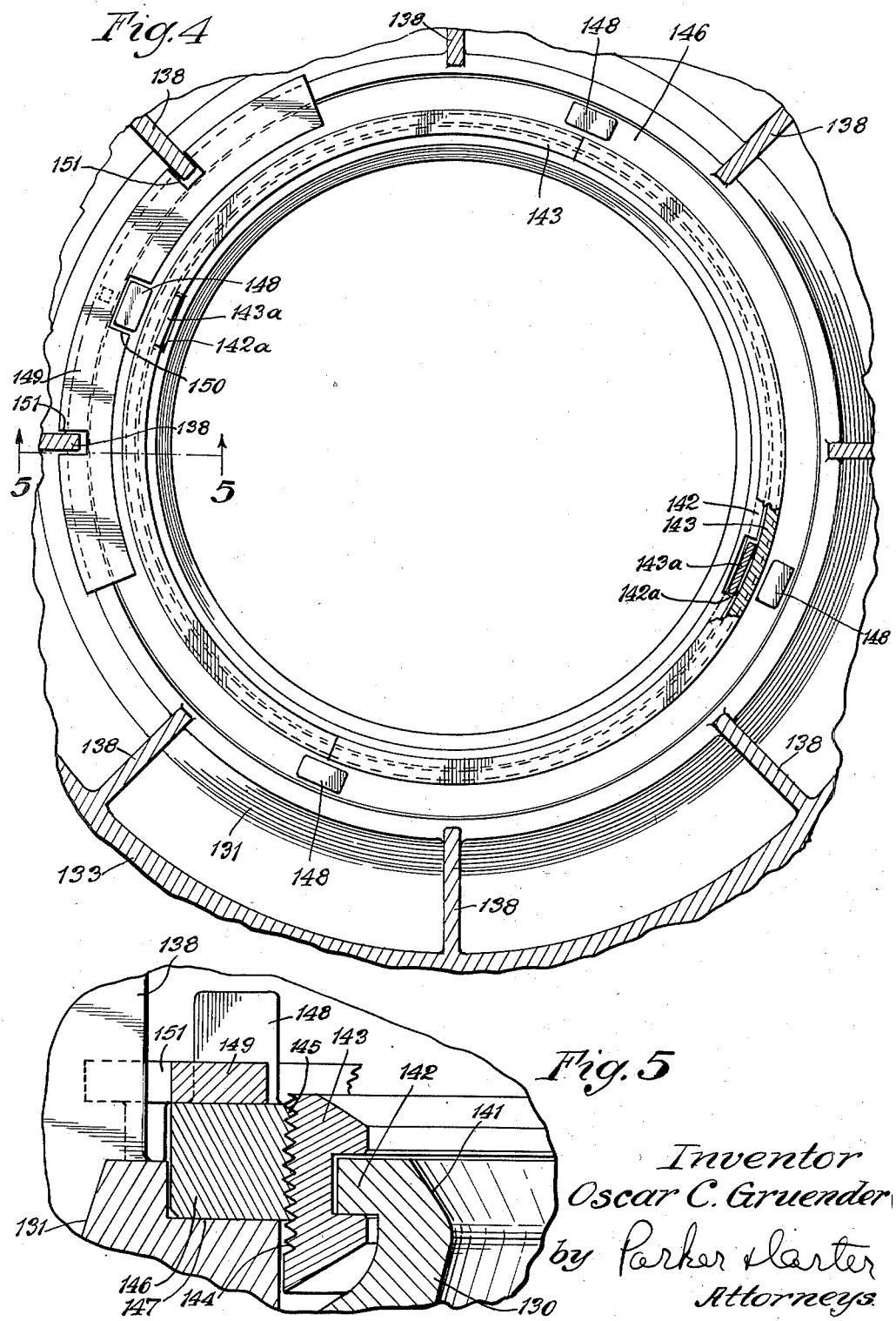

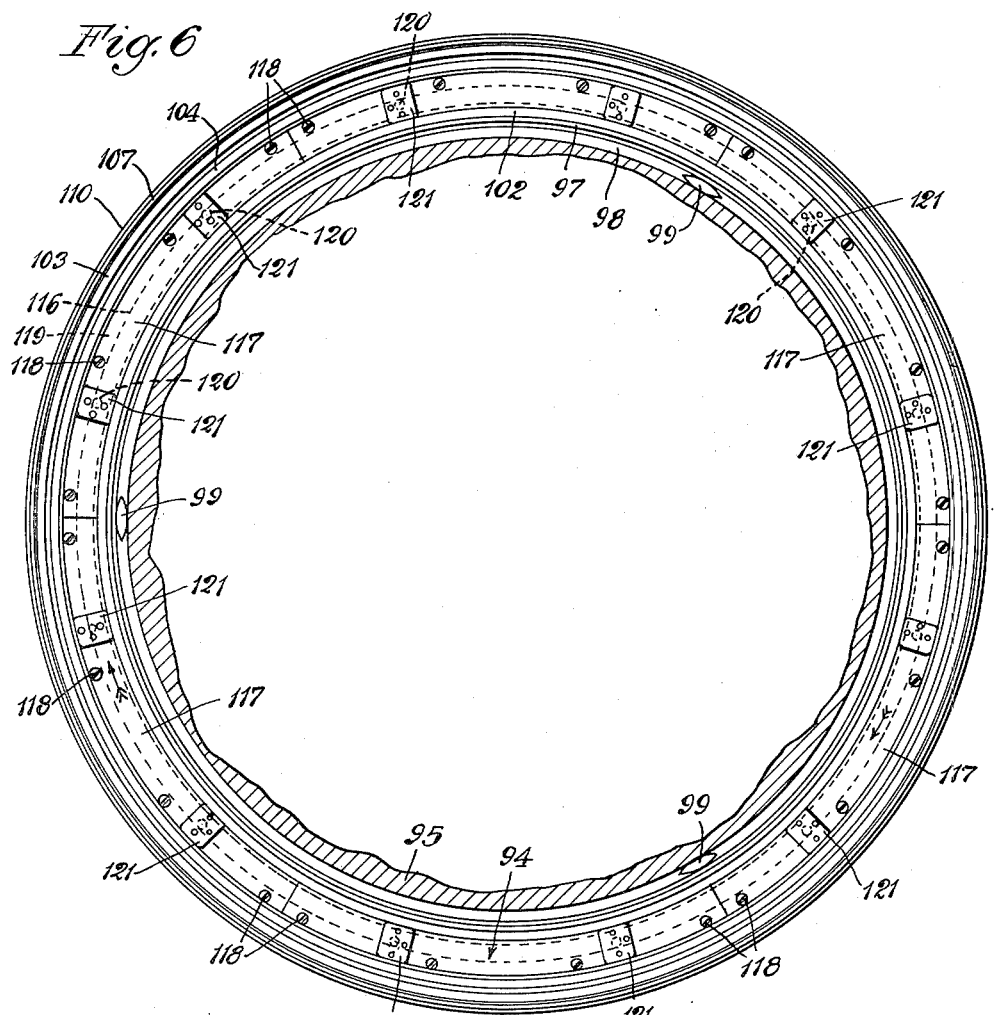
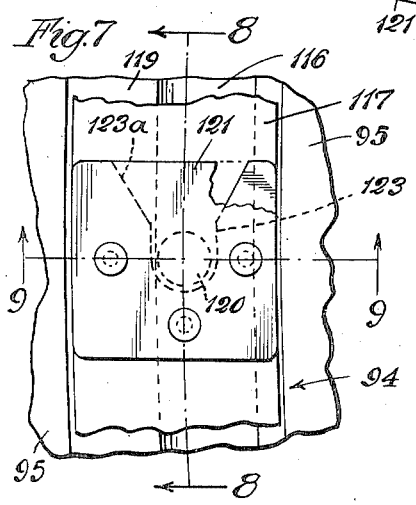
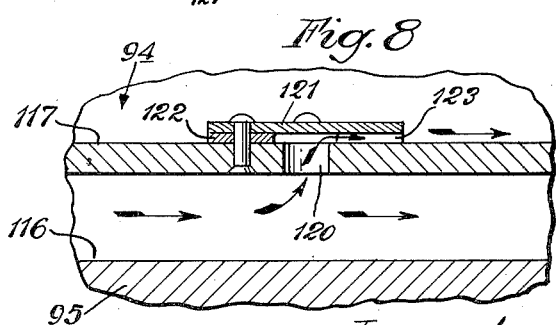

May 30, 1950     O. C. GRUENDER     2,509,920
FEEDING DEVICE FOR GYRATORY CRUSHERS
Filed Aug. 4, 1947     7 Sheets-Sheet 6
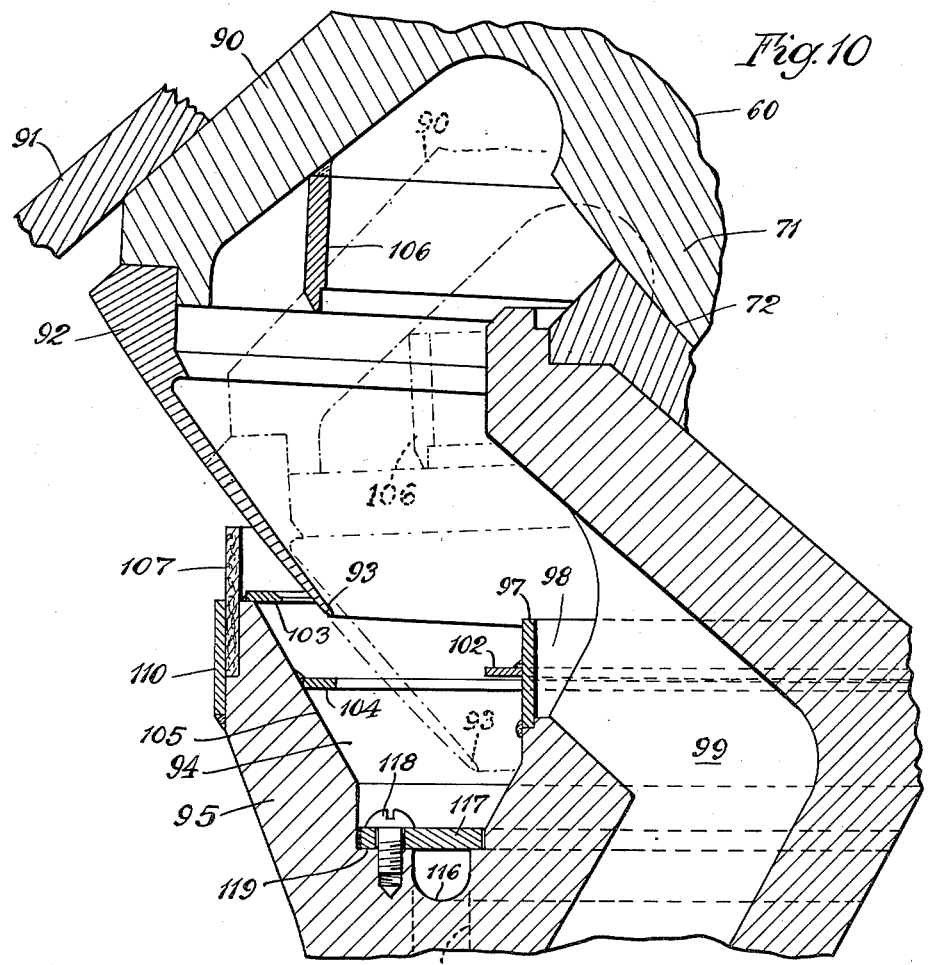
Inventor
Oscar C. Gruender
by Parker Harter
Attorneys May 30, 1950          O. C. GRUENDER          2,509,920
FEEDING DEVICE FOR GYRATORY CRUSHERS
Filed Aug. 4, 1947          7 Sheets-Sheet 7
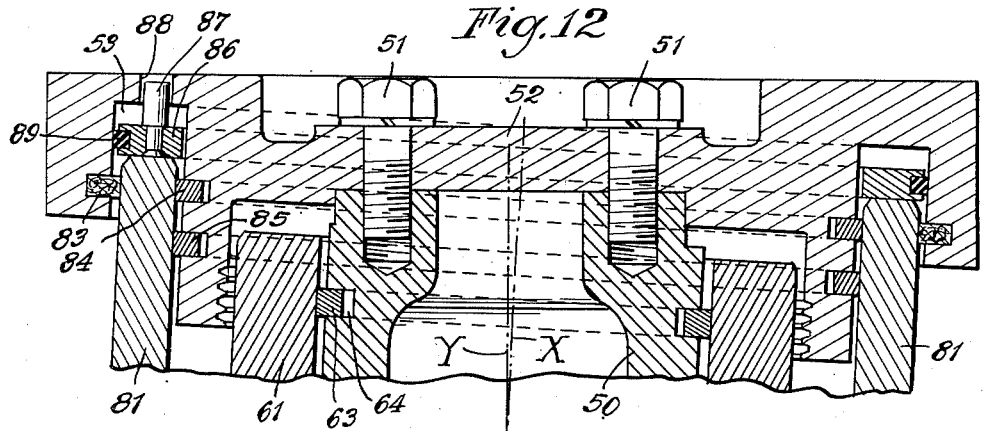
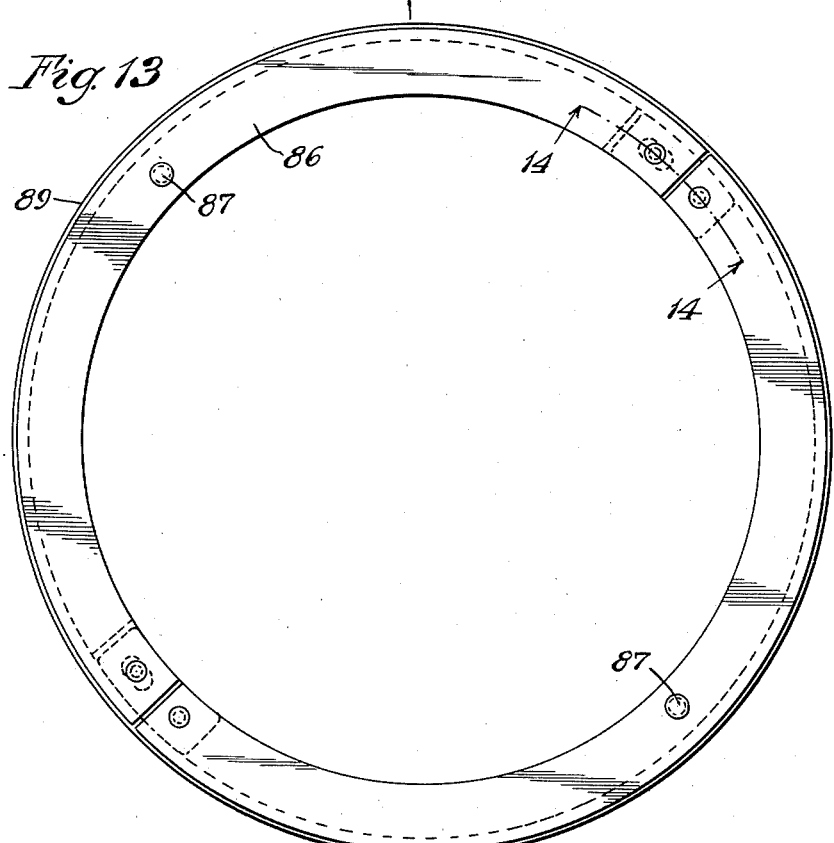
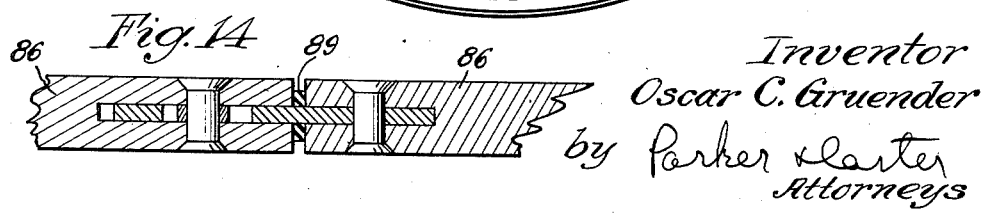
Inventor
Oscar C. Gruender
by Parker & Carter
Attorneys Patented May 30, 1950

2,509,920

UNITED STATES PATENT OFFICE 2,509,920

FEEDING DEVICE FOR GYRATORY CRUSHERS

Oscar C. Gruender, Milwaukee, Wis., assignor to Nordberg Manufacturing Company, Milwaukee, Wis., a corporation of Wisconsin Application August 4, 1947, Serial No. 766,044

3 Claims. (Cl. 241—202)

My invention relates to an improvement in fine reduction or attrition mills.

One purpose is to provide an improved mill in which materials may be reduced to substantial fineness.

Another purpose is to provide an improved mill in which hard materials, such as ores, can be reduced to extremely fine sizes.

Another purpose is to provide an improved feeding means for gyratory crushers and mills.

Another purpose is to provide an improved liquid seal for such mills.

Another purpose is to provide an improved main frame for such crushers and mills.

Another purpose is to provide an improved attrition liner.

Another purpose is to provide improved locking means for the attrition liner.

Another purpose is to provide improved centering and bearing means for the actuating eccentric of such mill or crusher.

Another purpose is to provide improved means for preventing rotation of the bowl of such a mill or crusher in relation to the main frame.

Another purpose is to provide improved lubricating means for such mill or crusher.

Another purpose is to provide improved sealing means for the top of the head and eccentric of such mill or crusher.

Another purpose is to provide a pneumatic release for such mill or crusher.

Other purposes will appear from time to time in the course of the specification and claims.

I illustrate the invention more or less diagrammatically in the accompanying drawings, wherein:

Figure 3 is a section on the line 3—3 of Figure 1;

Figure 4 is a section on the line 4—4 of Figure 2;

Figure 5 is a section, on an enlarged scale, on the line 5—5 of Figure 4;

Figure 6 is a section on the line 6—6 of Figure 2;

Figure 7 is an enlarged detail of the structure shown in Figure 6;

Figure 8 is a section on the line 8—8 of Figure 7;

Figure 9 is a section, on an enlarged scale, on the line 9—9 of Figure 7;

Figure 10 is an enlarged detail, in vertical radial section, of the liquid sealing portion of the device;

Figure 11 is an end elevation taken along the line 11—11 of Figure 3;

Figure 12 is a partial vertical axial section through an upper portion of the feed plate structure;

Figure 13 is a detail of a sealing ring shown in Figure 12; and

Figure 14 is a section, on an enlarged scale, on the line 14—14 of Figure 13.

Like parts are indicated by like symbols throughout the specification and drawings.

Figure 1:
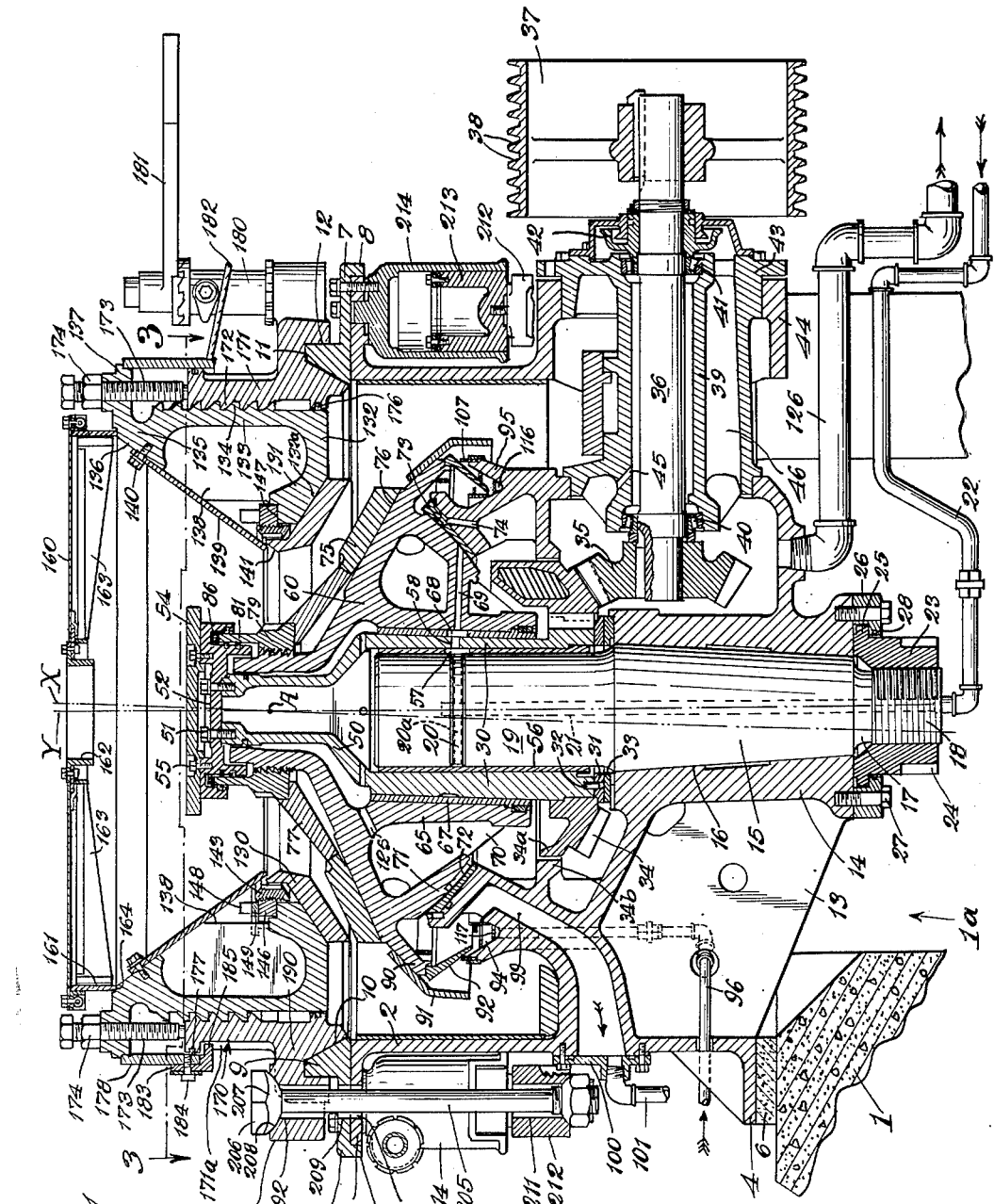
Figure 1 is vertical axial section.

Referring to the drawings, 1 generally indicates any suitable base upon which the crusher or attrition mill is mounted. 2 generally indicates a circumferentially extending main frame member having a top, outwardly extending, generally horizontal flange 3, and 4 is a bottom flange, the two flanges connected and strengthened by the vertical ribs or webs 5. 6 is any suitable grouting on base 1 and upon which the main frame is positioned.

Mounted on, and removably secured to the upper edge of the main frame, and overlying the flange 3, is a normally fixed abutment member or bowl supporting or receiving abutment ring 7 having a downwardly extending, circumferential outside flange 8 which surrounds and conforms to the edge of the flange 3. The ring has an inner, upwardly extending bowl abutment portion or bowl receiving flange 9, having a generally conic, outwardly tapered inner face 10, a flat top face 11, and a generally cylindrical outer face 12. 13 indicates three suitable U-shaped arm elements or inwardly extending radial ribs connecting and supporting the central hub 14.

Mounted within the hub 14 is the preferably somewhat conic central post 15 which conforms to a similarly formed inner face 16 of a generally central aperture of the hub 14. The post 15 has a downwardly reduced lower end portion 17, shown as screw-threaded as at 18. The post 15 has an upper and generally cylindrical portion 19, shown as provided with an exterior, circumferential oiling slot 20, and a horizontal oil passage 20a, which may suitably communicate with an axial oil passage 21 connected to any suitable oil delivery duct 22 from a suitable source of oil or lubricant.

23 is a nut, inwardly screw-threaded to receive the exterior threads 18 of the lower end of the shaft 15. It has vertical slots at the lower portion, as indicated at 24, and an upper, outwardly extending flange 25 in a supporting ring or securing member 26, removably secured to the lower end of the hub 14, as by any suitable securing bolts 27. Dust entrance is prevented by any suitable packing 28. It will be understood that when it is desired to remove the post 15, nut 23 is rotated in the opposite direction, causing the under side of the flange 25 to bear against the supporting ring 26. This results in an upward thrust on the threads of the post 15, freeing it from contact with the surface 16 of the hub 14. By continuous rotation of the nut, the post 15 is raised until the threads are no longer in engagement, permitting upward removal of the post. It will be understood that when the post is in position, it is fixed, and that the outer and generally spherical surface of its upper portion 19 constitutes a central support for the later described crushing head and its actuating means.

Surrounding the post portion 19 is an eccentrically apertured sleeve 30, which constitutes a unitary actuating member for gyrating the below described crusher head and for rotating the below described feed plate 45. It may be supported at its lower end as by a bearing ring 31 held against rotation in relation to the sleeve 30, as by pins 32. It rests upon the normally fixed bearing ring 33, suitably held against rotation in relation to the upper end of the sleeve 14. 34 is a bevel gear which may be keyed to the eccentric sleeve 30, which meshes with a pinion 35 on the drive shaft 36 rotated by a suitable exterior pulley 37, shown as channeled as at 38 to receive V-belts or other suitable driving means. The gear has a circumferential vertical flange 34a located within the circumferential ring 34b, integral with the arms 13. In the event of shaft failure, the gear and eccentric will move only slightly laterally, because the flange 34a will prevent such lateral displacement. Any suitable bearing assembly may be employed for the shaft 36. I illustrate a surrounding sleeve 39 carrying suitable bearing units 40 and 41 at its opposite ends. 42 generally indicates any suitable sealing structure. The sleeve 39 is shown as having an exterior closure flange 43, with which it is integral, which fits in and closes an aperture surrounded by any suitable sleeve 4, forming part of the main frame circumferential wall 2. 45 is an oil supply passage, and 46 a suitable oil removal passage.

It will thus be clear that, in response to belts engaging the drive pulley 37, the eccentric sleeve 30 will be rotated about the upper central post portion 19. The eccentric sleeve 30 is shown as having an upwardly extending portion 50, the upper end of which is shown in greater detail in Figure 12. Secured to it, as by screws 51, is a feed plate 52 having a circumferentially extending, downwardly faced slot 53. As will be clear from Figure 12, this slot is described about a center, indicated at X, which is eccentric to the center Y, about which the eccentric sleeve 30 rotates. The result of the rotation of the eccentric sleeve 30 is a rotation of the plate 52.

Any suitable top wear plate 54 may be secured to the plate 52, as shown in Figure 1, as by suitable screws 55. Thus material dropped upon the top of the feed plate 54 will be laterally, centrifugally thrown, as will later appear.

56 is any suitable bearing sleeve between the outer surface of the post 19 and the inner surface of the eccentric sleeve 30. It may be apertured as at 57 for the admission of oil, such aperture being aligned with the oil aperture 58 extending generally radially through the eccentric sleeve 30.

Figure 2:
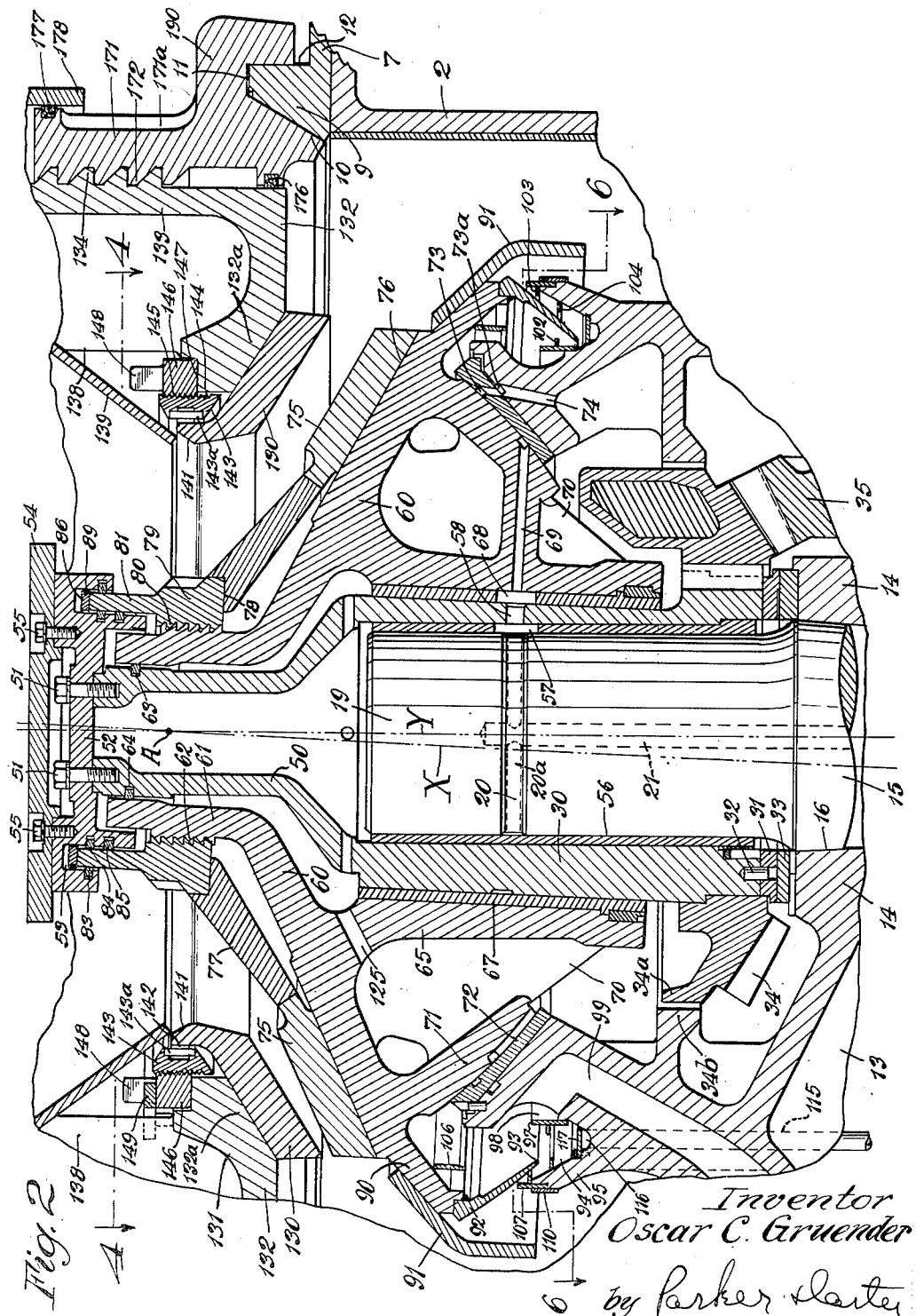
Figure 2 is a similar partial section on an enlarged scale.

60 generally indicates a gyrated crushing head which is gyrated about the center, in Figures 1 and 2, at A. It includes an upwardly extending hollow stem portion 61, externally screw-threaded as at 62. 63 is a sealing ring bearing against the inner surface of the hollow stem 61, but seated in a circumferential, outwardly opening slot 64 in the upper end portion 50 of the eccentric sleeve 30. It will be noted that the slot 64 is normal with the inclined axis X, and lies in a plane slightly inclined from the normal in relation to the center Y.

The head 60 is provided with a downwardly extending sleeve portion or bearing sleeve 65 which surrounds the eccentric sleeve 30 and is separated from it by any suitable wear-taking sleeve or liner 67 with its oil-passing aperture 68 aligned with an oil passage 69 in the lower portion of the head 60. The head also includes any suitable connecting webs 70 and a spherical bearing portion 71, the exterior and generally spherical bearing surface of which rest upon any suitable upwardly concave bearing or spherically surfaced supporting ring 72 mounted on an intermediate portion or extension of the main frame 2, as shown in Fig. 1, which surrounds, but is outwardly spaced from, the post portion 19. 73 is an annular oiling passage in the ring 72. Oil holes connect this passage with the annular oiling passage 73a, and oil holes 74 conduct the oil to the interior of the machine. It will be noted that the inner surface of the sleeve 65 is inclined in relation to the center Y, but is concentric with the center X. It will be understood that as the eccentric sleeve rotates, it imparts to the head 60 a gyratory movement about the center A.

75 indicates a crushing or attrition member or somewhat conic die or mantle resting upon an appropriately formed upper supporting surface 76 of the head 60. The die 75 is held in position by a generally conic positioning thrust member or sleeve 77 which is formed at its upper edge, as at 78, to receive a locking member or thrust ring or securing nut 79. The thrust ring or nut 79 is inwardly threaded, as at 80, to conform to the exterior threads 62 of the upper hollow stem portion 61 of the head 60. The ring or securing nut 79 is also provided with an upwardly extending sealing ring portion 81 which extends into the circumferential, downwardly opening annular channel or groove 53 in the lower surface of the plate 52. Suitable sealing rings or packings are provided, as at 83, 84 and 85, received in appropriate annular recesses, whereby the ring 81 is sealed at both sides. An upper sealing member or ring 86 is positioned in the slot 53 and is held against rotary movement, as by suitable positioning pins 87 extending into apertures 88 in the upper part of the plate 52. The ring 86 is provided with an exterior sealing member 89, which may be of rubber.

It will thus be understood that whereas the head 60 may gyrate about the center A, in response to rotation of the eccentric sleeve 30, leakage of oil from the inside to the outside is prevented, and also the inward penetration of dust particles from without. Nevertheless, the plate 52 and its outer wear-taking feed plate 54 may rotate in unison with rotation of the eccentric sleeve 30, whereas the head 60 and its wear-taking die 75, rotate only slightly, as they gyrate.

The head 60 is provided with an outwardly extending portion 90 upon which the exterior apron 91 may be secured. 92 indicates the downwardly and inwardly extending guard secured to the outer edge of the portion 90 of the head. Its lower edge 93 extends into a gutter 94 formed in the circumferentially extending annular portion 95 of the main frame. A suitable liquid, such as water, is delivered to the gutter 94, for example, along any suitable duct 96, a constant circulation of water being maintained. The water tends to fill the gutter 94 and to flow thereabout, overflowing inwardly over the edge of the inner dam 97. This dam may be in the form of a circumferentially extending ring defining th space 98 from which one or more outlet passage. 99 may extend. Such passages are shown in Figures 1, 2 and 10, and are directly above the U-shaped arms 13.

In Figure 1 is indicated a closure plate 100 through which water may flow along any suitable discharge pipe 101. As will be clear from Figure 10, I may provide any suitable splash-preventing elements. I illustrate, for example, a horizontal ring 102 extending outwardly intermediate the upper and lower edges of the dam 97. I illustrate, also, inwardly extending rings 103 and 104 inwardly extending from the outer inclined wall 105 of the gutter 94. I illustrate a vertical ring 106, shown as generally cylindrical and as downwardly depending from a lower portion of the head extension 90. In addition, I illustrate the surrounding and preferably flexible packing ring 107, upwardly extending from the upper outer edge of the gutter 94 and held and protected by a circumferentially extending metal ring 110.

In order to cause a positive movement of the water along the bottom of the gutter 94 I provide the following structure. The water inlet passage 96 delivers water through a duct 115 to an annular passage 116 located beneath the bottom of the gutter 94 and closed by a plate or plates 117 secured in position, for example, by suitable screws 118. It will be noted that the screws enter the upper surface of a ledge 119, located at one side of the passage 116, as shown in Figure 10. The water which is delivered to the passage 116 along the duct 115 may escape through the plate or plates 117 through one or more upwardly extending discharge passages 120. These passages are partly closed by deflector plates 121 spaced upwardly from the upper surface of the member 117, as by spacers 122, which leave a free space 123, as shown in Figure 8. With water being delivered under pressure to the passage 116, and escaping through the outlets 120, the escape passage 123 delivers water along the bottom of the gutter 94; that is to say, along the upper surface of the plate or plates 117, in the direction of the arrows of Figure 8. The result is a positive circulation of water along the bottom of the gutter 94, the water so circulating tending to swirl and scour, and remove foreign particles. These particles, so far as they penetrate over the upper edge of the member 107, and into the interior of the gutter 94, are therefore carried over the upper edge of the dam 97 and are removed along the passages 99 and the discharge ducts 101. Note, as in Figure 7, that the outlet 123 may be somewhat outwardly flared, as at 123a.

As many of the discharge passages may be employed as is convenient or necessary, twelve being shown in Figure 6. Whereas the number may be varied to suit the needs of a particular situation, I find that a structure with twelve of the delivery passages 123 and three of the outlet passages 99 works efficiently. Thus, when the eccentric sleeve 30 is rotated, and the feed plate 54 is rotated, and the die 75 is gyrated, there is no perceptible entry of dust into the necessary series of bearings. And oil may be delivered from any suitable source, along the oil inlet duct 22, and may flow through the above described oil ducts and such additional ducts as are shown at 125, etc., back to the oil return pipe 126.

Opposed to the attrition die 75 is the upper attrition liner or ring 130. It will be noted that the opposed surfaces of the members 75 and 130 are generally conic, but converge somewhat toward the outlet or lower and outer end of the attrition zone defined between the two members. The bowl liner 130 is mounted on a tiltable or releasable bowl and support, which will now be described. The bowl structure proper, indicated at 131, has a bottom web or portion 132 and a preferably integral outer cylindrical portion 133, exteriorly screw-threaded, as at 134, and having an upper annular portion 135 with a more or less conic inner surface 136 and an outwardly extending top flange 137. It is provided, also, with generally radial ribs 138 having upper edges which downwardly and inwardly prolong the conic surface 136, and which receive a conic feed hopper or feed directing ring 139, removably secured, as by members 140, to the surface 136, and overlying the upper inner edge of the bowl liner 130. It will be noted that the liner 130 has an upwardly extending annular portion 141 with an outwardly extending top flange 142 which may be apertured or provided with exteriorly open notches 142a. Keys 143a are secured to a split or segmental threaded locking ring 143, the keys entering the exterior notches 142a preventing rotation of the locking ring in relation to the member 130.

The ring 143, in turn, is externally screwthreaded, as at 144, to conform to interior threads 145 on the annular locking member 146 which seats in a recess or on a shelf 147 on an upwardly and inwardly extending bowl bottom portion 132a. The ring 146 has upwardly extending lugs 148 adapted to be received in notches 150 in segmental locking plates 149. The plates 149 have external notches 151 adapted to engage forward edges of the bowl. Thus, since the ribs 138 are fixed, the locking plates 149, when in the position in which they are shown in Figures 2 and 4, prevent any rotation of the ring 146. This, in turn, holds the bowl liner 130 upwardly drawn against the conic surface of the bowl portion 132a. However, when removal of the liner 130 is desired, it is a simple matter to lift the locking plate 149 upwardly out of locking position, and to knock the ring 146 to the released position, by operating a tool or hammer against the upwardly extending lugs 148. The deflector gutter 139, meanwhile, both protects the above described structure and directs the feed downwardly and inwardly toward the attrition zone between the members 75 and 130.

Any suitable feed-directing or limiting means 160 may be employed, as shown in Figure 1. It may include, for example, an outer circumferential ring 161, an inner and feed aperture defining ring 162, and suitable reinforcing or connecting members 163. The structure, as a whole, may rest upon the portion 135 of the bowl structure, being centered in any suitable shelf or circumferential ledge 164.

The bowl structure proper is adjustably mounted in a bowl support, generally indicated as 170. It includes a generally cylindrical inner portion 171, inwardly screw-threaded, as at 172, to conform to the exterior threads 134 of the bowl wall 133. The bowl may be raised or lowered by a relative rotation of the portions 133 and 171. When the adjustment has been made, the parts may be locked against relative rotation by the locking or thrust screws 173 which pass through the flange 137, and may be locked in position as by lock nuts 174. Any suitable packing or dust guard means may be employed, as at 176 and 177. The outer dust guard 177 bears against the inner surface of the cylindrical ring 178 which may be welded or otherwise secured to the exterior of the bowl portion 137.

It will be understood that any suitable means may be employed for imparting relative rotation, for adjustment purposes, to the members 171 and 133. I illustrate, for example, the windlass 180 with its actuating handle 181 and its flexible element 182. The details of this structure do not, of themselves, form part of the present invention, and will not be further described, it being understood that any suitable means may be employed for imparting an adjusting rotation to the member 133 in relation to the member 171. It will be understood that the exterior of the member 171 is provided with a plurality of vertical recesses 171a. I may lock the parts against relative rotation by a suitable removable locking block 183, shown in Figure 1 as removably secured to a lower portion of the ring 178, as by any suitable locking screw 184. The member 183 has an inwardly extending lug 185 adapted to enter one of the slots or channels 171a.

The portion 171 has an outwardly extending bottom flange 190 with a plurality of lateral arcuate edged bosses or enlargements 191 apertured, as at 192, to receive tension rods, which will later be described, but which permit the ring support structure to tilt upwardly away from the flange 9, against which it normally seats, when tramp iron or uncrushable material is present in the crushing or attrition zone. In order to prevent rotation of the bowl support and to insure that the parts seat or are centered properly when the bowl support drops back into the normal position in which it is shown in Figure 1, I provide a plurality of lugs 193, outwardly extending from some of the bosses 191 and carrying an arcuate surfaced abutment 194 which may be the head of a removable screw or bolt 195, held in position, for example, by a nut 196, as shown in Figure 11. The arcuate or domed surface of the member 194 abuts against a positioning pin 197, suitably hardened, which is removably positioned on the flange 7. It may, for example, pass through a boss 7a, and have a reduced shank 198, the lower end of which is screw-threaded, as at 199, to receive any suitable securing nut 200.

The bowl support 171 may normally be held in the position in which it is shown in Figure 1, by any suitable releasable means. I illustrate, for example, the tension rods 205 which pass through the apertures 192 and have enlarged upper holding heads 206, downwardly domed as at 207, to engage seating pockets 208 which surround the upper ends of the apertures 192 through the bosses 191. These pockets perform a centering function, as is shown in Figure 1, whereby the member 205 is kept out of contact with the walls of the apertures 192, with a consequent prevention of wear.

The flanges 3 and 7 are apertured, as shown at 209 and 210, to clear the member or rod 205. The rods extend downwardly through suitable apertures 211 in any suitable yoke or yokes 212, normally held in downward position by thrust pistons 213 in suitable cylinders 214 secured to the lower surface of the main frame flange 3. It will be understood that a suitable liquid or fluid, under proper pressure, is delivered to the interior of the piston structure so formed, in such fashion that the downward thrust against the member or members 212 normally exceeds the crushing or attrition stress. But when a predetermined crushing or attrition stress is exceeded, or when uncrushable material passes through the crushing zone defined between the members 75 and 130, then the bowl structure can tilt upwardly without breakage. It will be understood that when the pressure within the cylinder structure is released, the entire bowl structure may readily be upwardly removed, either for repair or replacement, or to clear the uncrushable material from the crushing cavity. The details of the pressure maintaining means are not herein shown, since they do not, of themselves, form part of the present invention, and are shown and described in my earlier filed, copending application Serial No. 697,227, Pneumatic release for cone crushers, filed in the United States Patent Office on September 16, 1946.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

I illustrate an attrition or reduction mill in which a gyrated head gyrates about a predetermined center A within a normally fixed bowl. The head carries an attrition die 75, and the bowl carries an attrition liner 130. The material to be reduced passes through the fixed feed limiting ring 162 in the plate 160. Any suitable feed limiting means or feeders may be employed. The material to be ground, in suitable volume, is delivered to the upper surface of the rotating plate 54. The rotation of the plate projects the material centrifugally outwardly against the feeding hopper 139, resulting in a substantially uniform feed throughout the periphery of the crushing or attrition zone. The particles are delivered downwardly and inwardly by the hopper 139, and are received by the member 77, the surface of which is generally perpendicular to the path of downward and inward movement of the particles. The particles there received are substantially stopped, and then flow downwardly and outwardly into the attrition zone between the opposed surfaces of the members 75 and 130. The gyration of the die 75 about the center A lifts the material upwardly, as it flows outwardly through the attrition zone, and grinds it against the liner 130. Since the individual particles are substantially smaller than the distance of closest approach between the opposed liner and die, the mass of particles are ground upon and against each other. The relatively slight angle of the die 75 prevents an unduly rapid passage of the particles through the attrition zone. They receive a number of impact and attrition impulses, which varies with the particular machine, but which is preferably not less than five or six. The reduced particles thereafter escape over the lower, outer edge of the die 75, pass over the apron 91, and escape downwardly through the discharge space 1a in the base 1. It will be understood that the arm structure 13 and the sleeve surrounding the drive shaft 36 have between them substantially vacant areas through which the ground material may flow.

It will be understood that whereas I have illustrated a grinder or fine reduction mill, nevertheless many of the features herein shown may be employed in connection with gyratory crushers in which a head is gyrated within a bowl. Thus the means for gyrating the head is equally applicable to coarse and fine reduction gyratory crushers, and the feature of a rotated feed plate, in connection with a gyrated head, properly lends itself to use with fine, intermediate, and coarse gyratory crushers. The same is true of the water-seal above described.

In considering the general application or operation of the various features above described, I employ a normally fixed central post 19 about which the eccentric sleeve 30 rotates. The eccentric sleeve performs the double function of gyrating the head 60 and of rotating the feed plate 54. The material passing through the attrition or crushing zone is reduced by the gyratory movement of the head 60, the material being actually engaged by the die 75 and the liner 130. The water seal is advantageous in that water is caused to rotate in the trough or gutter 94. The various outwardly extending flanges or rings, as shown in Figures 2 and 10, prevent splashing of the water and escape of the water outwardly over the edge of the trough or gutter 94. The rotation of the water in the gutter or trough causes it to adhere to the walls, and this surface tension lessens the tendency of the water to partake of the gyratory movement of the member 92 or of any part associated with the head itself.

The sealing ring 86, shown as expandible in Figures 13 and 14, located in the top plate 52, is preferably formed in halves, and rotates with the feed plate support 52, through the medium of the pins 87. A rubber ring or washer 89 is fitted into an exterior recess in the ring halves 86. When the ring halves 86 rotate, with the feed plate support 52, centrifugal force urges each half outwardly, causing it to urge the rubber ring or washer 89 against the outer wall of the slot 53 of the feed plate support 52. Thus the ring does not bear heavily against the contacting face of the head nut or its upward extension 81. The rubber ring 89 further effects a perfect seal against the entrance of dust at the outer diameter of the ring. And since the ring 86 bears against the top of the head nut, no dust can enter underneath the ring. The ring halves 86 may be made of a lead-base bronze and no lubrication is required. No matter what wear takes place to change the vertical position of the ring 86 in respect to the contacting parts, it will automatically find its new position, and function effectively to seal the top of the machine against the entrance of dust.

The above described means for holding the die 75 in place are of the self-tightening type. The nut 79 is threaded to engage the exterior threads 62 on the head, and bears against the intermediate members 77, which contact and thrust downwardly and outwardly against the die 75, holding it constantly firmly in position. The upper attrition member or liner 130 is also of the self-tightening type, because the threaded locking ring 143 is forced to rotate with it.

The rapidly revolving feed plate is an essential element of my attrition mill, and without it, it would be impossible to get a uniform mixture of coarse and fine material all around the crushing or attrition chamber. The primary function of the feed spout or aperture 162 is to direct the material to the center of the feed plate. It may also be employed for feed limitation.

Throughout the description of the structure herein I have spoken of my invention as a crusher or attrition mill. I have done this because, as earlier pointed out, many of the features may be applied to crushers. But a primary purpose of my invention is to provide an attrition mill to produce a much finer product than is normally produced by so-called crushers, even by what are called in the field "fine crushers." My attrition mill is not, as such, a crusher, and is not properly described as a crusher. I shall now describe the use of my invention as an attrition mill.

I produce fines by attrition, and not by the crushing of a single layer of particles between crushing members. Material of minus ½ inch, ⅜ inch, or ¼ inch, containing fines, is fed to the mill. The material is delivered by the spout or delivery ring 162 upon the center of the rapidly rotating feed plate 54, and centrifugal force mixes the material and feeds it in a uniform stream to the stationary conic hopper 139. This centrifugal feeding action delivers a thoroughly mixed feed all around the attrition chamber, no matter how much segregation may have occurred by the time the material is landed on the feeding plate. The material enters the attrition chamber between the attrition members 75 and 130 in a thick stream. The lower member 75 may be considered a die, and partakes of a gyratory movement, about the center A, of an amplitude somewhat greater at the discharge periphery than at the point of entrance. For instance, in a 4-foot mill the movement at the feed entrance or inner edge of the member 75 may be of the order of 1½ inch, while the movement at the discharge edge is of the order of 2 inches. The angle of the attrition member 75 is less than the angle of repose of the material undergoing attrition. If the lower attrition member had no movement, the material would remain stationary on it, the movement of the head 60 providing the means whereby the material is progressively propelled through the attrition chamber.

The material entering the attrition chamber on its open or inner and upper side is compacted, by the propelling stroke of the head, until the mass is reduced to approximately one-half its initial thickness. Since the particles are superposed on each other, the initial impact is most effective in making a large amount of fines. The coarse particles in the feed serve as commuting media, much as balls function in a conventional grinding mill. Hence, the importance, both of using a mixed feed, and of uniformly distributing the coarser particles in the mass. This result is obtained by the centrifugal action of the revolving feed plate 54.

After the lower attrition member 75 has reached its closest approach to the upper attrition member or liner 130, the speed and amplitude of retraction are such that the mass falls generally vertically, under gravity, away from the upper attrition member to a lower position on the lower or gyrated attrition member. This results from the fact that the length of movement of the head, and its speed of movement, are such that it is withdrawn from beneath the crushed or compacted material faster than the material will accelerate under gravity. The mass is still falling when the lower attrition member 75 has reached its point of furthest recession from the upper attrition member 130.

As the lower attrition member reverses its direction of movement and again rises toward the upper member, it strikes the freely falling mass, and effects a separation of the particles. As it completes its upward movement of closest approach to the upper member, it again impacts and compresses the mass against the upper attrition member. This cycle of free fall and subsequent compression continues, as to each unit of the mass, until that unit is discharged at the periphery of the attrition member. After the initial impact, there is only a gradual reduction of the mass, to avoid packing. The successive impacting of the mass gradually reduces the larger particles, but since the attrition chamber is comparatively short, not all particles are reduced to a minute degree of fineness.

It is desirable that the discharged product contain a fair percentage of coarse particles, to provide voids in the mass and to prevent packing. My principle of attrition reduction, of alternately impacting and releasing a thick mass of material, so that the mass moves progressively through the attrition chamber, produces a large amount of fines. About 30% to 40% of the discharged product may be minus 65 mesh, which is ideal for flotation in the non-ferrous metal field. The minus 65 mesh particles may be extracted by screens, classifiers, or by pneumatic separation. The oversize product is advantageously fed back to the attrition mill, in closed circuit. My process of attrition reduction does not require a close setting of the attrition members. The members are set relatively far apart, to provide space for the mass, but this coarse setting produces a fine-sized product.

As to the structure of the mill itself, I employ an improved main frame which can advantageously be used in connection with gyratory crushers. The same is true of my improved main shaft or central post structure.

I claim:

1. In a crusher or attrition mill, a main frame having a circumferential outer member, an inner hub, and integral supports connecting them, a fixed post extending upwardly from said inner hub and having an exterior and generally cylindrical bearing surface, an eccentric sleeve surrounding said fixed post and rotatable thereabout, said eccentric sleeve having an outer bearing surface eccentrically offset in relation to the inner surface of the sleeve, the axes of its inner and outer surfaces being inclined, and intersecting at a point above the top of said fixed post, said eccentric sleeve having an upward projection and a generally horizontal feed plate mounted thereon, a driving connection for rotating said eccentric sleeve and feed plate, a head including a bearing sleeve surrounding and conforming to the exterior surface of said eccentric sleeve, a support for said head, positioned outwardly of said post, said head and said support having opposed conforming spherical bearing surfaces concentric with the point of intersection of the axes of the inner and outer surfaces of the eccentric sleeve, and a sealing connection between said head and said feed plate.

2. In a crusher or attrition mill, an upper and normally fixed material engaging member, a lower material engaging member, the two members defining together a generally conic crushing or attrition zone, gyrating means for imparting to the lower material engaging member a gyratory movement toward and away from the upper material engaging member, about a center positioned adjacent the top of the crushing or attrition zone, a hopper formed and adapted to deliver material directly into the upper portion of the attrition zone throughout its circumference, centrifugal means in said hopper for mixing material and for distributing the material, to the crushing or attrition zone, including a rotatable feed receiving member mounted for rotary movement in the hopper about the vertical axis of the mill, means for delivering feed to said rotary feed member, and driving means for rotating the feed member at a sufficient rate of rotation to impart substantial centrifugal movement to articles fed thereto, whereby said feed member is adapted to distribute material throughout the circumference of the hopper, said driving means including a driving connection with said gyrating means.

3. The structure of claim 2 characterized by and including a fixed post, having an outer bearing surface, an eccentrically apertured sleeve rotatable about said bearing surface, and means for rotating said sleeve, said sleeve having an exterior bearing surface, the lower material engaging member being rotatable about the exterior bearing surface of said eccentrically apertured sleeve, the axis of the eccentric inner aperture of the sleeve and of the exterior bearing surface of the sleeve being inclined in relation to each other, and intersecting at a point adjacent the top of the crushing or attrition zone.

OSCAR C. GRUENDER.

REFERENCES CITED

The following references are of record in the file of this patent:

UNITED STATES PATENTS

| Number | Name | Date |
|---|---|---|
| 243,545 | Gates | June 28, 1881 |
| 271,138 | Sharpneck | Jan. 23, 1883 |
| 768,955 | Russell | Aug. 30, 1904 |
| 1,145,629 | Symons | July 6, 1915 |
| 1,226,275 | Symons | May 15, 1917 |
| 1,402,255 | Sanborn | Jan. 3, 1922 |
| 1,537,564 | Symons | May 12, 1925 |
| 1,553,202 | Symons | Sept. 8, 1925 |
| 1,791,584 | Symons | Feb. 10, 1931 |
| 1,817,044 | Symons | Aug. 4, 1931 |
| 1,863,529 | Symons | June 14, 1932 |
| 2,017,108 | Symons | Oct. 15, 1935 |
| 2,054,326 | Jacobson | Sept. 15, 1936 |
| 2,091,315 | Gruender | Aug. 31, 1937 |
| 2,135,324 | Brown | Nov. 1, 1938 |
| 2,147,833 | Fahrenwald | Feb. 21, 1939 |
| 2,254,425 | Fahrenwald | Sept. 2, 1941 |
| 2,305,616 | Gruender | Dec. 22, 1942 |
| 2,306,437 | Gruender | Dec. 29, 1942 |
| 2,310,737 | Gruender | Feb. 9, 1943 |
| 2,341,543 | Gruender | Feb. 15, 1944 |
| 2,350,737 | Eiben | June 6, 1944 |
| 2,359,987 | Gruender | Oct. 10, 1944 |
| 2,409,391 | Rumpel | Oct. 15, 1946 |

FOREIGN PATENTS

| Number | Country | Date |
|---|---|---|
| 850,650 | France | Sept. 18, 1939 |
| 656,857 | Germany | Feb. 17, 1938 |